United States Patent
Mack et al.

(10) Patent No.: US 11,347,836 B2
(45) Date of Patent: May 31, 2022

(54) METHOD FOR AUTHENTICATING A VEHICLE, AUTHENTICATION UNIT, SERVICE UNIT AND CENTRAL COMPUTER UNIT EXTERNAL TO THE VEHICLE

(71) Applicant: Continental Automotive GmbH, Hannover (DE)

(72) Inventors: Rolf Mack, Frankfurt am Main (DE); Sunil Bharamgoudar, Frankfurt am Main (DE)

(73) Assignee: Continental Automotive GmbH

( * ) Notice: Subject to any disclaimer, the term of this patent is extended or adjusted under 35 U.S.C. 154(b) by 117 days.

(21) Appl. No.: 16/844,175

(22) Filed: Apr. 9, 2020

(65) Prior Publication Data

US 2020/0327218 A1 Oct. 15, 2020

(30) Foreign Application Priority Data

Apr. 12, 2019 (DE) .................... 10 2019 205 362.9

(51) Int. Cl.
*H04L 29/06* (2006.01)
*G06F 21/44* (2013.01)
*G06Q 50/06* (2012.01)

(52) U.S. Cl.
CPC ............. *G06F 21/44* (2013.01); *G06Q 50/06* (2013.01); *G06Q 2240/00* (2013.01)

(58) Field of Classification Search
CPC .......... G06F 21/44; G06F 21/30; G06F 21/45; G06F 21/00
See application file for complete search history.

(56) References Cited

U.S. PATENT DOCUMENTS

2004/0003252 A1\* 1/2004 Dabbish ................ B60R 25/307
    713/175
2008/0211624 A1\* 9/2008 Micali ..................... H04L 9/007
    340/5.6

(Continued)

FOREIGN PATENT DOCUMENTS

DE    102011101535 A1    2/2012
DE    102012010723 A1    11/2012

(Continued)

OTHER PUBLICATIONS

European Patent Office Examination Report dated Aug. 26, 2020 for the counterpart European Patent Application No. 20167797.8.

(Continued)

*Primary Examiner* — Jason K Gee (57) ABSTRACT

A method for authenticating a vehicle with a service unit by way of a central computer unit external to the vehicle is provided. An initial value is transmitted from the service unit to the authentication unit and, depending on the initial value, the authentication unit reads a request command from a request table and outputs it to an interface of the vehicle. The authentication unit receives an output value from the interface, generated in response, and calculates a vehicle check value from the output value. The vehicle check value and the initial value are transmitted to the central computer unit. Depending on the initial value, the central computer unit reads a characteristic value from a characteristic value table and calculates a further vehicle check value. When the vehicle check value and the further vehicle check value match the central computer unit sends a predetermined enable signal to the service unit.

10 Claims, 4 Drawing Sheets

(56) References Cited

U.S. PATENT DOCUMENTS

2014/0085110 A1    3/2014  Scofield et al.
2014/0195808 A1*   7/2014  Lortz ................. H04L 63/0263
                                                              713/170
2018/0190127 A1    7/2018  Thoppae et al.

FOREIGN PATENT DOCUMENTS

DE    102016218986 A1 *  4/2018  ......... B60R 25/2018
DE    102016218986 A1    4/2018
FR         2881304 A1    7/2006

OTHER PUBLICATIONS

Prajnamaya Dassa et al. "A secure authentication scheme for RFID systems", Procedia Computer Science 78 ( 2016 ) S. 100-106; International Conference on Information Security & Privacy (ICISP2015), Dec. 11-12, 2015, Nagpur, India; Available online at www.sciencedirect.com.
Search Report dated Dec. 19, 2019 from corresponding German Patent Application No. DE 10 2019 205 362.9.

* cited by examiner

METHOD FOR AUTHENTICATING A VEHICLE, AUTHENTICATION UNIT, SERVICE UNIT AND CENTRAL COMPUTER UNIT EXTERNAL TO THE VEHICLE

CROSS-REFERENCE TO RELATED APPLICATIONS

This U.S. patent application claims the priority to German patent application No. 10 2019 205 362.9 filed Apr. 12, 2019, which is hereby incorporated by reference.

TECHNICAL FIELD

The invention relates to a method for authenticating a vehicle, to an authentication unit, to a service unit and to a central computer unit external to the vehicle.

BACKGROUND

When using a vehicle, a plurality of functions and motor vehicle-related services that require authentication of the vehicle or the driver thereof with infrastructure devices are used. This may be necessary for example at barriers to restricted-access or paid parking lots that are accessible only to particular vehicles and/or drivers. Another example is filling stations or charging stations whose use is restricted to company vehicles. In the current prior art, authentication is performed by way of local systems that are generally restricted to the respective application case. In this case, authorized drivers are provided for example with magnetic cards or radio devices by way of which they are able to authenticate themselves or activate a function.

The increasing spread of communication systems that allow communication between vehicles (what are known as Car-2-car systems) or between vehicles and infrastructure units (what are known as Car-2-X systems) is resulting in new possibilities for vehicle-related services. The usual local solutions, which are restricted to individual application cases, are no longer preferred with regard to the possibilities of C-2-C or C-2-X systems.

The multiplicity of local solutions could be replaced with a central solution. A central authentication system has however not yet become established. One problem when authenticating a vehicle or a driver is that of using personal or sensitive data. For data protection reasons, it is necessary to withhold personal data from the service provider when authenticating a vehicle or a driver. However, certain services require the driver and/or the vehicle to be authenticated reliably and securely with the service provider.

A method that allows authentication using certain secret values without transmitting the secret values themselves is described in a conference contribution by Dass, Prajnamaya and O M, Hari: "A secure authentication scheme for RFID systems" (Procedia Computer Science, 2016, vol. 78, pages 100-106).

It is desirable to make it possible to securely authenticate a vehicle or a driver with an infrastructure unit without transmitting sensitive data to the infrastructure unit.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for authenticating a vehicle with a service unit by way of a central computer unit external to the vehicle is provided During the method, an authentication unit is provided in the vehicle. In other words, the authentication unit is arranged on the vehicle as an independent device or as part of the vehicle. The authentication unit may comprise for example a microprocessor and/or microcontroller. In a first step, an initial value is generated by the service unit and transmitted from the service unit to the authentication unit. In other words, the service unit with which the vehicle and/or the driver is intended to be authenticated creates a random or pseudorandom value as initial value in order to initiate the method and transmits it to the authentication unit. The service unit may for example comprise a microprocessor and/or microcontroller and a radio unit and be arranged for example in a barrier at which the driver of the vehicle requests entry. The transmission may for example take place via a radio connection between the service unit and the authentication unit.

Depending on the initial value, the authentication unit reads a request command from a request table stored in the authentication unit. In other words, the request table is stored in the authentication unit. The request table may contain the at least one request command as table element. In order to determine the request command to be read from the request table, selection is performed using a predetermined method, wherein the initial value is used, alone or in combination with other values, as input variable, or a value calculated from the initial value.

The method may for example determine an index value associated with the request command for the initial value. The request command may be for example a program code and/or signal for querying a predetermined parameter of the vehicle from a network of the vehicle. The request command read from the request table is output by the authentication unit to an interface of the vehicle. In other words, the request command is transmitted from the authentication unit to the interface. The interface of the vehicle may be for example an OBD connection (on-board diagnostic connection) of the vehicle. The request command may be a command to output a predetermined value of a vehicle component of the vehicle that allows the vehicle to be identified and for example meets the CAN standard.

In the vehicle, the request command is executed by the vehicle component, wherein said vehicle component outputs an output value in response to the request command. In other words, after the vehicle component receives the request command, the output value associated with the request command is generated. The vehicle component may be for example an engine control unit of the vehicle. In this case, the request command may provide an output of an identification value of the engine control unit as output value. The created output value is received from the interface by the authentication unit. In other words, the output value is transmitted from the vehicle component to the authentication unit via the interface.

The authentication unit uses a predetermined check value function to calculate a vehicle check value from the output value. The check value function may be for example a hash value function or a pseudorandom value function (pseudorandom number generator, PRNG). In other words, the authentication unit calculates the associated vehicle check value, wherein the calculation is performed by way of the predetermined check value function. The vehicle check value may be for example a check signature, a hash value or a pseudorandom value that may be used to check the output value, but from which the output value itself is not able to be reverse-calculated. In a further step, the vehicle check value generated from the output value and the initial value are transmitted from the authentication unit to a central computer unit. This may be performed for example by way of a mobile radio network and/or the Internet. The central computer unit may for example be a central computer or a computer network and be located outside the vehicle. The transmission may take place directly from the authentication unit to the central computer unit or be routed via the service unit.

Depending on the received initial value, the central computer unit reads a characteristic value from a characteristic value table stored in the central computer unit. The characteristic value is an expected value that matches the output value received from the vehicle component when the method functions correctly. It may for example be the abovementioned unique identification value of the engine control unit. The characteristic value to be read may be determined using the same methods as in the authentication unit. The central computer unit uses the predetermined check value function to calculate a further vehicle check value from the characteristic value. The vehicle check value calculated from the output value by the authentication unit and the further vehicle check value generated from the characteristic value by the central computer unit are checked by the central computer unit for a match. In the event that the vehicle check value and the further vehicle check value match, the central computer unit sends a predetermined enable signal to the service unit. In other words, the central computer unit sends an enable signal to the service unit. The sending may for example be performed in a wired or wireless manner.

Therefore, a vehicle may be able to be authenticated to a service unit without transmitting sensitive output values to the service unit itself. The service unit and/or an unauthorized recipient that intercepts transmitted values is/are thus not able to arrive at the output value or reconstruct it from the intercepted values. It may thus be made possible to couple the vehicle to the central computer unit via the request table containing the associated characteristic value table.

One development of the invention makes provision that an identification value uniquely associated with the authentication unit is stored in the authentication unit. In other words, the identification value is a value that uniquely identifies the authentication unit. The authentication unit uses the check value function to generate an identification check value from the identification value. In other words, the authentication unit uses the check value function to calculate the identification check value.

There is provision that the identification check value is transmitted together with the vehicle check value to the central computer unit. In other words, there is provision in this development that, in addition to the vehicle check value, the identification check value is transmitted from the authentication unit to the central computer unit. The central computer unit checks the identification check value against entries in an identification table stored in the computer unit for a match. In other words, the central computer unit checks whether the received identification check value is stored in the identification table of the central computer unit. There is provision that the central computer unit sends the predetermined enable signal to the service unit only if one of the entries in the identification table matches the identification check value. Sending the enable signal thus also requires, in addition to the vehicle check value matching the further vehicle check value, the identification check value to be stored in the identification table.

This development results in that the method requires a check of the authentication unit, and security is thereby able to be increased.

One development makes provision that the authentication unit generates a second initial value, and a secret value is stored in the authentication unit. A further secret value is stored in the central computer unit. In other words, a respective secret value in the form of what is called a shared secret is stored in both units. In order to successfully perform the method, the secret value and the further secret value have to be identical. The authentication unit uses the predetermined check value function to calculate a session check value that is generated from the secret value stored in the authentication unit, the initial value generated by the service unit and the further initial value generated by the authentication unit. In other words, the session check value is generated by way of the check value function from the secret value stored in the authentication unit, the initial value generated by the service unit and the further initial value generated by the authentication unit.

The session check value is transmitted together with the vehicle check value from the authentication unit to the central computer unit. The central computer unit uses the check value function to generate a further session check value that is created from the further secret value, the initial value and the further initial value. In other words, the central computer unit uses the check value function to generate the further session check value from the further secret value stored in the central computer unit, the initial value and the further initial value. The central computer unit checks the further session check value and the session check value for a match. The central computer unit thus checks whether the session check value generated by the authentication unit and the further session check value generated by the central computer unit are identical. There is provision that the central computer unit sends the predetermined enable signal to the service unit only if the session check value matches the further session check value. In other words, it is necessary for both session check values to be identical in order to continue. It is thereby able to be ensured that the same initial value, the same further initial value and the same secret value are provided in the central computer unit and the authentication unit.

This results in that a respective authentication procedure between the authentication unit and the central computer unit is able to be secured by way of the session check values. It is possible for example that the respective initial values and/or the respective further initial values and/or the respective secret values differ from one another in different authentication methods. This may lead to a situation whereby a respective authentication method may have an individual session check value. If the already used session check value is used again, there is a deviation, because for example the secret value may be updated during a respective authentication procedure.

One development makes provision that the central computer unit sends the further secret value as the predetermined enable signal to the service unit. In other words, the predetermined enable signal is the further secret value stored in the central computer unit and that matches the secret value stored in the authentication unit. The service unit uses the check value function to calculate a first enable check value from the secret value and the initial value. The service unit uses the check value function to calculate a second enable check value N from the first enable check value M. The first enable check value M is transmitted from the service unit to the central computer unit. The second enable check value N is transmitted from the service unit to the authentication unit.

The central computer unit uses the check value function to calculate an update value U from the further secret value and the first enable check value M. The further secret value stored in the central computer unit is updated with the update value U by way of a predetermined update function. In other words, the central control unit updates the further secret value, wherein an updated secret value is calculated from the already present further secret value and the update value U by way of the predetermined update function. The further secret value originally stored in the external computer unit is replaced with this updated secret value.

The authentication unit uses the check value function to calculate a further first enable check value M' from the secret value and the initial value. A further second enable check value N' is calculated from the further first enable check value M' by way of the check value function. In other words, the authentication unit performs the same steps as took place in the service unit. After the further second enable check value N' has been calculated, this is checked by the authentication unit for a match with the second enable check value N. In other words, the authentication unit checks whether the further second enable check value N', calculated by the authentication unit, is identical to the second enable check value N calculated by the service unit and transmitted to the authentication unit. It is thereby checked whether the further secret value transmitted from the central computer unit to the service unit and the initial value stored in the service unit match the corresponding values in the authentication unit. If a match is present, the authentication unit uses the check value function to calculate the update value from the secret value and the further second enable check value N'.

The secret value stored in the authentication unit is updated with the update value by way of the predetermined update function, as in the central computer unit. In other words, the authentication unit updates the secret value, wherein the updated secret value is calculated from the already present secret value and the update value by way of the predetermined update function. The secret value originally stored in the authentication unit is replaced with this secret value. The same updated secret value as in the central computer unit is thereby calculated in the authentication unit. The authentication unit and the central computer unit, at the end of the method step, thus contain the same updated secret values for a future authentication procedure. The update function may be for example an XOR function (exclusive OR link).

This development results in that the secret value shared by the central computer unit and the authentication unit is checked for a match and is updated during the method. It is thereby ensured that the secret values remain synchronous.

One development makes provision that the request command to be read from the request table and the characteristic value to be read from the characteristic value table are selected by way of a selection function depending on the session check value. In other words, a predetermined selection function is stored in the central computer unit and in the authentication unit. The selection function is used by the central computer unit and the authentication unit to determine the request command to be read from the request table and the characteristic value to be read from the characteristic value table on the basis of the initial value, of the further initial value and of the secret value. This results in the advantage that the selection depends on three variables. An influence on the selection of the characteristic value and of the request command is thereby able to be avoided.

One development makes provision that the selection function is the Luhn algorithm. In other words, the selection function is a modulo-10 function. The selection is thus made by determining an index value that is associated with the characteristic value to be read and the request command to be read. The index value is determined by dividing the session check value by 10 with a remainder, wherein the index value is the remainder that remains when the session check value is divided by 10.

One development makes provision that a communication procedure is initiated between the service unit and the authentication unit and/or a controller of the vehicle following reception of the enable signal by the service unit. In other words, the service unit communicates with the authentication unit and/or the controller of the vehicle as soon as the authentication unit has been authenticated by the central computer unit.

One development makes provision that a service identifier is transmitted to the central computer unit by the service unit. The central computer unit checks whether the service identifier for the identification value is activated in the central computer unit. The central computer unit sends the predetermined enable signal to the service unit only if the service identifier for the identification value is activated. In other words, the method comprises transmitting the service identifier from the service unit to the central computer unit. The service identifier may for example uniquely identify the service unit or a function provided by the service unit.

A status of the service identifier for the identification value may be defined in the central computer unit. The status "activated" means that the activation of the service unit or the function provided by the service unit for the authentication unit with the identification value is permissible. The status "deactivated" means that the activation of the service unit or the function provided by the service unit for the authentication unit with the identification value is impermissible. There may for example be provision that the enable signal is sent by the central computer unit only if the service identifier for the identification value is activated in the central computer unit.

One development makes provision that the central computer unit transmits a predetermined query signal to an input unit if the service identifier for the identification value is deactivated. In other words, the query signal is transmitted to the input unit if the authentication unit with the associated identification value is not activated for the service unit or for the function of the service unit with the associated service identifier. The input unit may be for example a mobile telephone, a tablet, an input system of a vehicle or a mobile user device. The input unit outputs a predetermined warning signal upon receiving the query signal. The warning signal may be for example a haptic, acoustic or visual signal. In the case of a predetermined user input, the input unit sends an activation signal to the central computer unit. In other words, the activation signal is transmitted from the input unit to the central computer unit if the predetermined user input has been performed on the input unit. There may for example be provision that the warning signal comprises a text message that asks the user to activate the function. If the user then for example touches a predetermined region on a touch-sensitive screen as user input, the input unit may generate the activation signal and send it to the central computer unit. The central computer unit activates the service identifier upon receiving the activation signal for the identification value. As an alternative or in addition, the enable signal is sent to the service unit.

One development makes provision that the transmissions between the authentication unit and the central computer unit are routed via the service unit. In other words, transmissions from the authentication unit to the central computer unit and from the central computer unit to the authentication unit are routed via the service unit. There may for example be provision that messages are sent from the authentication unit to the service unit, are received thereby and are forwarded to the central computer unit. This results in the advantage that no direct transmission between the authentication unit and the central computer unit is necessary. The transmissions may for example take place from the authentication unit by way of Wi-Fi direct, Bluetooth, Car-2-X or comparable wireless transmission methods with ranges in the region of meters. It is thus not necessary to contact the central computer unit via mobile Internet.

A method for generating a characteristic value table is provided. The input unit transmits a coupling signal to a central computer unit, and the central computer unit then transmits at least one request command for requesting a characteristic value from a vehicle component of the vehicle to the authentication unit. The authentication unit stores the request command in a request table in the authentication unit. The request command is additionally output by the authentication unit to an interface of the vehicle. In the vehicle, the request command is executed by the vehicle component and the characteristic value is generated in response. The characteristic value is received from the interface by the authentication unit. The characteristic value is transmitted from the authentication unit to the central computer unit. The central computer unit stores the characteristic value in the characteristic value table of the central computer unit.

An input unit is configured so as to send a coupling signal to a central computer unit in order to initiate a method for generating a characteristic value table.

An authentication unit is configured so as to receive an initial value, to read a request command from a request table stored in the authentication unit depending on the initial value and to output the request command to an interface of the vehicle. The authentication unit is configured so as to receive an output value from the interface, generated by a vehicle component in the vehicle in response to the request command, and to use a predetermined check value function to calculate a vehicle check value associated with the output value and to transmit the vehicle check value, associated with the output value, to a central computer unit.

A central computer unit is configured so as to receive a vehicle check value and an initial value and to read a characteristic value from a characteristic value table stored in the central computer unit depending on the initial value. The central computer unit is configured so as to use a predetermined check value function to calculate a vehicle check value associated with the characteristic value, to check said vehicle check value with the received vehicle check value for a match and, in the event that the check values match, to send a predetermined enable signal to a service unit.

A service unit is configured so as to generate an initial value and to send it to an authentication unit and to activate a predetermined function upon receiving a predetermined enable signal.

The input unit, of the authentication unit, of the central computer unit and of the service unit, have features as have already been described in connection with the developments of the method. For this reason, the corresponding developments of the input unit, of the authentication unit, of the central computer unit and of the service unit are not described again here.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

In the figures, elements with the same function are each provided with the same reference symbols.

Figure 1:
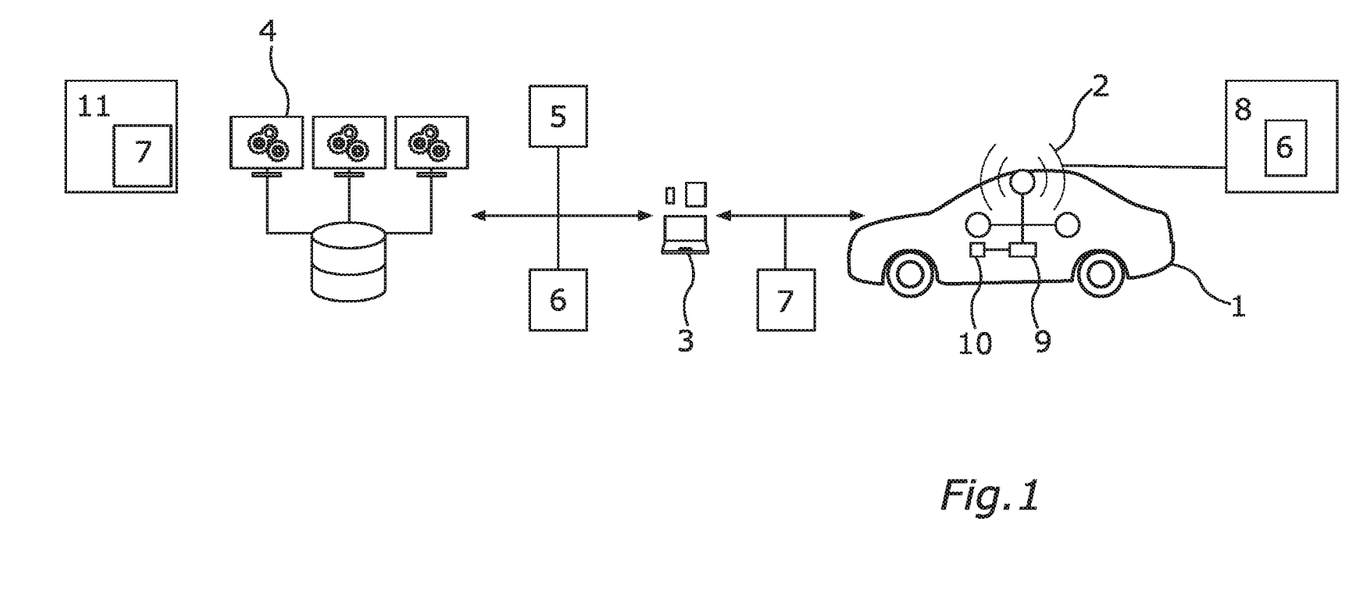
FIG. 1 shows a method for generating a characteristic value table.

FIG. 1 shows a method for generating a characteristic value table. The aim of coupling is to incorporate a vehicle 1 into a system so that it is able to be authenticated with third parties. In order to allow the vehicle 1 to be authenticated, there is provision to use an authentication unit 2. The authentication unit 2 may comprise for example a microprocessor and/or a microcontroller. The authentication unit 2 may be installed in the vehicle 1 or be connected to the vehicle 1 as an accessory. In this case, there may for example be provision that the authentication unit 2 is connected to an OBD interface of the vehicle 1 as a plug-in component (stick or dongle). In order to couple the vehicle 1, there may be provision that a predetermined user input is entered on an input unit 3 by a driver or occupant of the vehicle 1. The input unit 3 may be for example a mobile terminal, in particular a smartphone, a tablet or a laptop. It may also be a console of the vehicle 1.

There may be provision that the user enters personal identification data or registration data in the course of the user input. Following the user input, the input unit 3 may generate a coupling signal 5 and transmit it to a central computer unit 4. The coupling signal 5 may for example comprise the registration data of the user and/or information about the vehicle 1 and/or the authentication unit 2. The coupling signal 5 may for example be transmitted via mobile Internet. The central computer unit 4, in response to receiving the coupling signal 5, may transmit at least one request command 6 for requesting an associated characteristic value 7 to the authentication unit 2. The sending may be performed for example directly to the authentication unit 2 via mobile Internet or via the input unit 3. The request command 6 may be received by the authentication unit 2 and stored in a request table 8. The request command 6 may additionally be output by the authentication unit 2 to an interface 9 of the vehicle 1. The interface 9 may be for example an OBD connection of the vehicle 1 or a connection to an Ethernet network of the vehicle 1.

In the vehicle 1, a vehicle component 10 may receive and execute the request command 6 and output the characteristic value 7 as output value in response. The vehicle component 10 may be for example an engine controller of the vehicle 1. The characteristic value 7 may be for example an identification number of the engine control unit. The characteristic value 7 may be output from the interface 9 of the vehicle 1 and received by the authentication unit 2. The authentication unit 2 may transmit the characteristic value 7 to the central computer unit 4. The central computer unit 4 may receive the characteristic value 7 and store it in a characteristic value table 11. The characteristic value table 11 and the request table 8 may contain indexing, wherein the respective characteristic value 7 in the characteristic value table 11 is associated with a request command 6 in the request table 8 by way of an index value 13.

By creating the request table 8 and the characteristic value table 11, a shared secret is provided to the central computer unit 4 and the authentication unit 2. The request commands 6 are designed such that they lead to the same characteristic value 7 being output from the vehicle 1. Thus, the authentication unit 2 and the vehicle 1 are functionally connected to one another. If for example the authentication unit 2 is integrated into another vehicle, this leads to another characteristic value 7 being output when the request command 6 is input into the vehicle 1. The central computer unit may generate a secret value S during the coupling. The secret value S may be transmitted to the authentication unit 2 and be stored in the central computer unit 4 as a further secret value S'.

Figure 2:
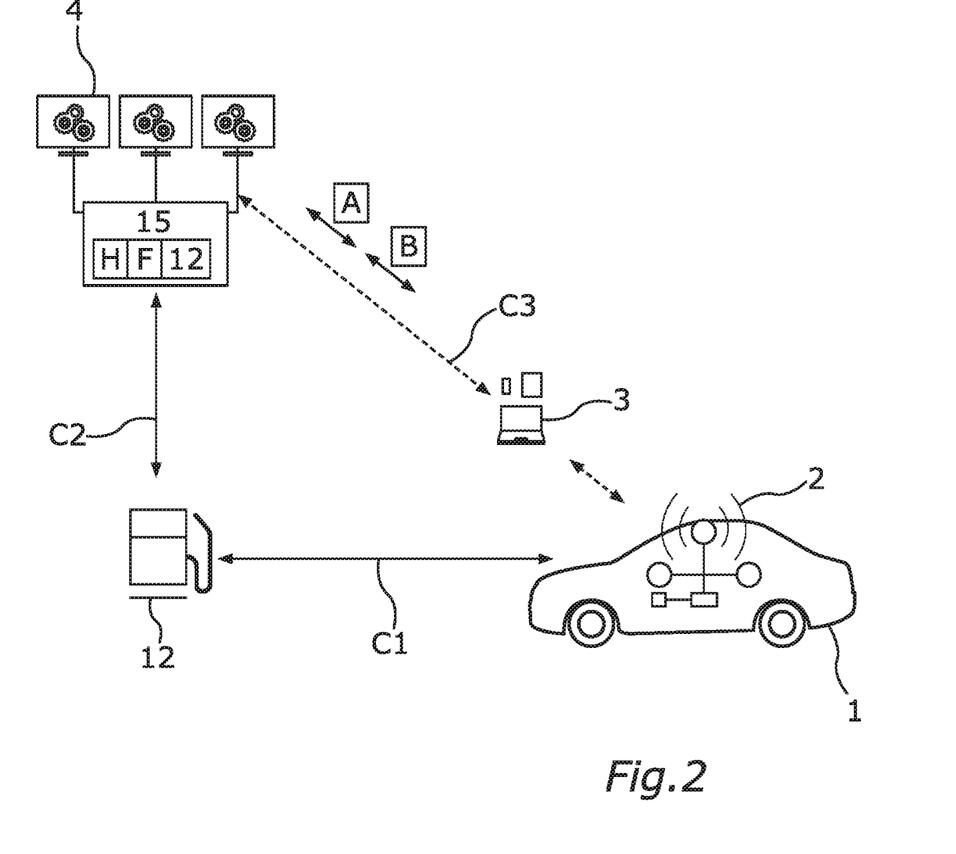
FIG. 2 shows a method for authenticating a vehicle with a service unit by way of a central computer unit external to the vehicle.

FIG. 2 shows the vehicle 1 being authenticated to a service unit 12 by the central computer unit 4. There may be provision that a function linked to the vehicle 1 and performed by a service unit 12 requires the vehicle 1 to be authenticated with the service unit. The service unit 12 may be for example a fuel pump at a filling station, a charger or a barrier. There may be provision that only certain vehicles are intended for the service unit 12 or a function of the service unit 12. A communication connection C1 between the vehicle 1 or the authentication unit 2 and the service unit 12 may for example exist via an unsecured connection. This may mean for example that the communication takes place in unencrypted form. For this reason, it may be forbidden to send sensitive information for authenticating the vehicle 1 with the service unit 12 via the communication connection C1. In order nevertheless to allow secure, reliable authentication of the vehicle 1 with the service unit 12, the authenticity of the vehicle 2 with the service unit 12 is confirmed by the central computer unit 4.

There may for example be provision that a driver of the vehicle 1 enters an input on the service unit 12 at the beginning of an authentication method. There may also be provision that the authentication method is initiated automatically by the service unit 12 if the vehicle 1 is for example located at a predetermined distance from the service unit 12. This may be the case for example if the vehicle 1 is in front of a service unit 12 in the form of a barrier. The method may make provision that communication is initiated between the service unit 12 and the authentication unit 2. During the method, communication may simultaneously be set up between the service unit 12 and the central computer unit 4. In order to allow secure authentication, there may be provision that the communication between the central computer unit 4 and the service unit 12 takes place in encrypted form via a secure communication connection C2. There may be provision that an additional communication connection C3 is set up between the authentication unit 2 and the central computer unit 4, this being able to take place via the input unit 3.

Figure 3:
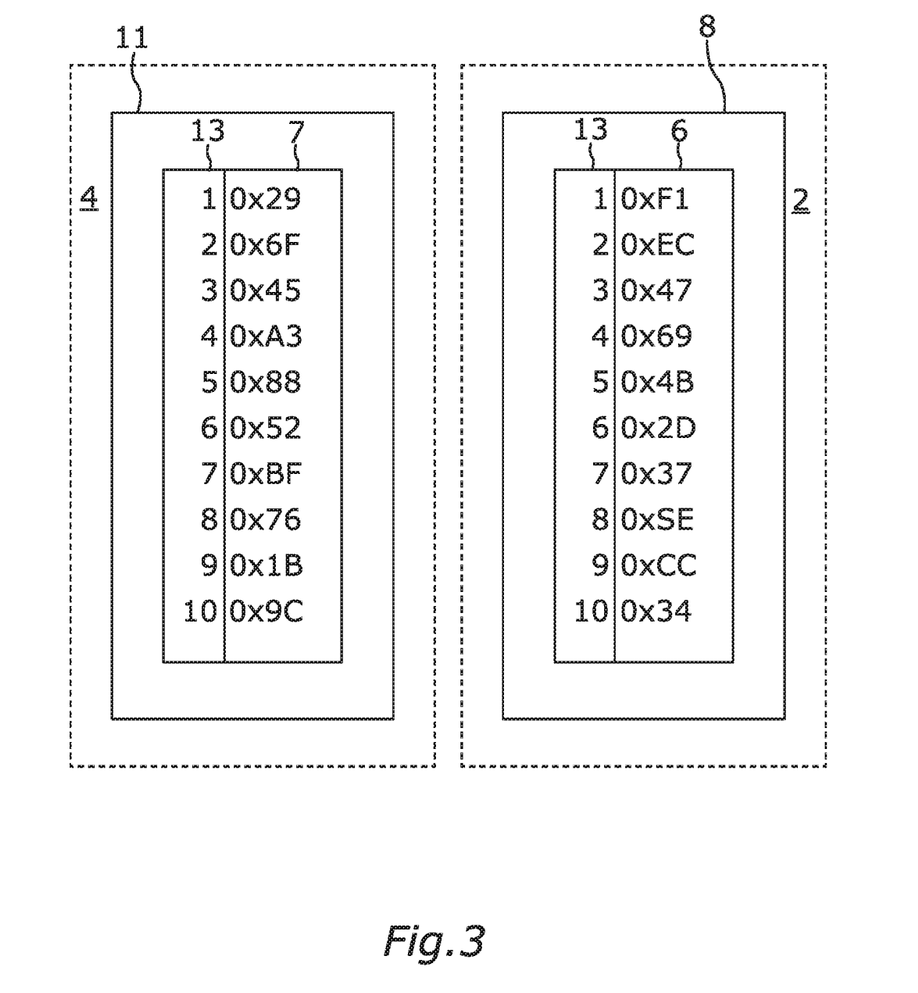
FIG. 3 shows a characteristic value table and the associated request table.

FIG. 3 shows a possible characteristic value table 11 containing the respective characteristic values 7 and that is stored in the central computer unit 4. Each of the characteristic values 7 may be assigned an index value 13. Characteristic values 7 may be values that identify the vehicle 1 or components 10 of the vehicle. They may in particular be a make of the vehicle 1, a model, a construction year, a VIN number, a chassis number, or an identification number of an engine control unit. The individual characteristic values 7 in the characteristic value table 11 thus overall form what is called a fingerprint of the vehicle 1 that allows the vehicle 1 to be uniquely identified.

A request table 8, which may store the request commands 6 with the associated index values 13, is stored in the authentication unit 2 as corresponding counterpart for authenticating the vehicle 1. A corresponding characteristic value 7 in the characteristic value table 11 with a respective index value 13 is associated with a respective request command 6 with the same index value 13. The request command 6 may be for example a code for the CAN bus of the vehicle 1 that has the effect of outputting the associated characteristic value 7 from the interface 9. In other words, the characteristic values 7 in the characteristic value table 11 are the expected values that should be output by the vehicle 1 upon a request to the vehicle 1 by way of the associated request command 6. The request commands 6 may be for example request commands 6 that were transmitted by the central computer unit 4 to the authentication unit 2 during the coupling method in order to query the associated characteristic values 7 of the vehicle 1.

Figure 4:
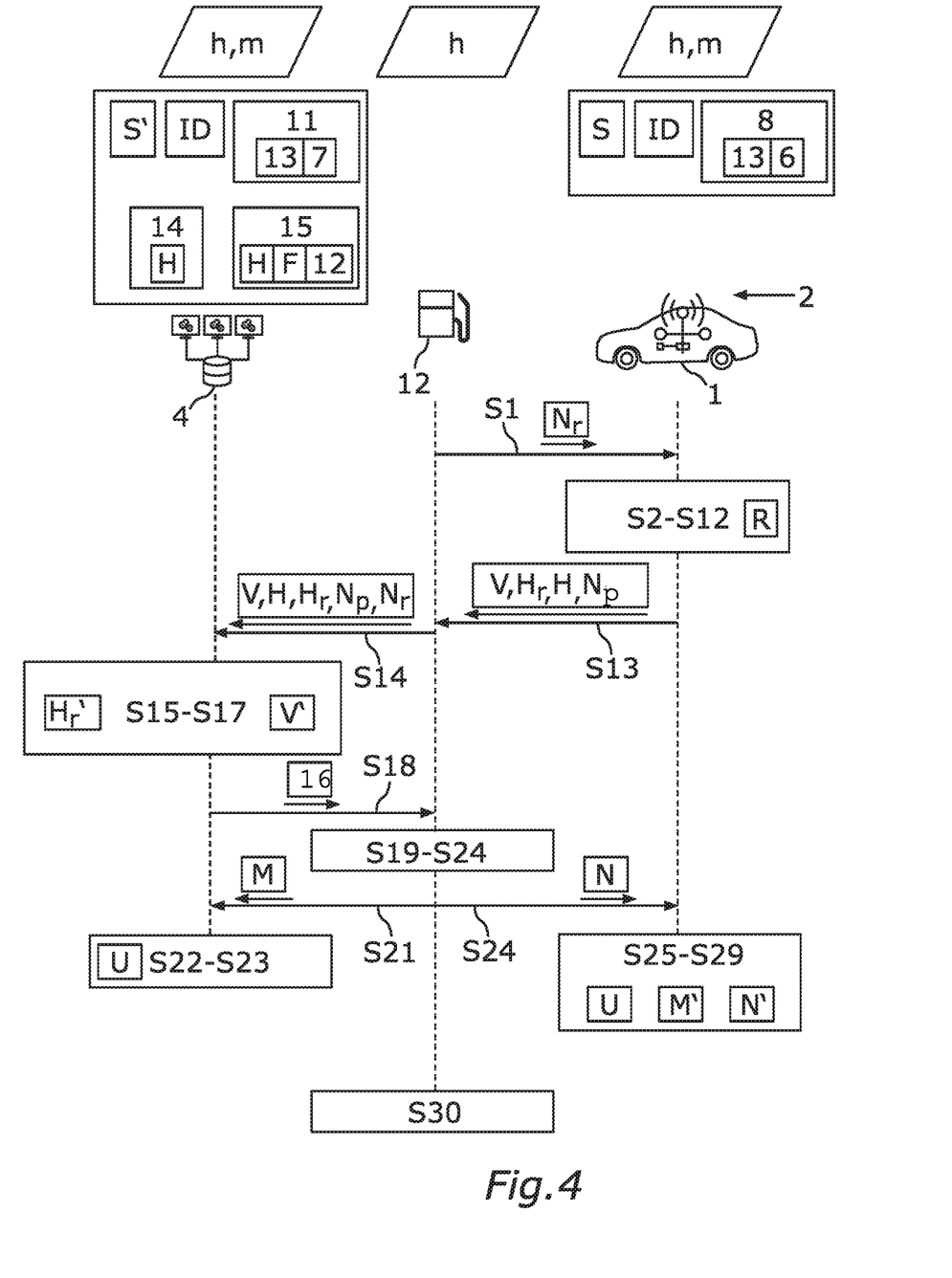
FIG. 4 shows a method for authenticating a vehicle with a service unit by way of a central computer unit external to the vehicle.

FIG. 4 shows a sequence of a method for authenticating a vehicle 1. There may be provision that the central computer unit 4, the service unit 12 and the authentication unit 2 are configured so as to perform check values by way of a check value function h. There may be provision that the central computer unit 4 and the authentication unit 2 are coupled to one another, that is to say that the coupling method has been performed with the central computer unit 4 and the authentication unit 2. Coupled may mean for example that the further secret value S', the identification value ID of the authentication unit 2 and the characteristic value table 11 are stored in the central computer unit 4. The secret value S, the identification value ID and the request table 8 may be stored in the authentication unit 2.

At the beginning of the method, there may be provision that the service unit 12 uses a random function or a pseudorandom function to generate an initial value Nr. The initial value Nr may be transmitted from the service unit 12 to the authentication unit 2 (51).

After the authentication unit 2 receives the initial value Nr, the authentication unit 2 may use a random function to generate a further initial value Np (S2).

The authentication unit 2 may use the check value function h to calculate a session check value V from the secret value S, the first initial value Nr and the second initial value Np, which session check value may be associated with the secret value S, the first initial value Nr and the second initial value Np (S3).

The next sub-step S4 comprises the authentication unit 2 determining the index value 13 in order to be able to read one of the request commands 6 from the request table 8. There may be provision that the index value 13 is selected depending on the secret value S, the initial value Nr and the second initial value Np. For this purpose, there may be provision that the index value 13 is calculated from the session check value V by way of a selection function m. There may for example be provision that the index value 13 is a remainder of a division of the session check value V by the number 10.

The authentication unit 2 reads the request command 6 that is associated with the calculated index value 13 from the request table 8 (S5). The read request command 6 is output to the interface 9 of the vehicle 1 by the authentication unit 2 and received by the vehicle component 10 (S6). Like in the coupling method, a response signal R that is identical to the characteristic value 7 is output by the vehicle component 10 (S7). The authentication unit 2 may receive the response signal R from the interface 9 (S10). The authentication unit 2 may use the check value function h to calculate a vehicle check value Hr associated with the response signal R (S11). There may additionally be provision that the authentication unit 2 uses the check value function h to calculate an identification check value H from the identification value ID (S12).

The session check value V, the vehicle check value Hr, the identification check value H and the further initial value Np may be transmitted from the authentication unit 2 to the service unit 12 (S13).

The service unit 12 may receive the values and forward them to the central computer unit 4 together with the initial value Nr (S14).

The central computer unit 4, upon receiving the values, may check, in a step S15, whether the identification check value H of the authentication unit 2 is registered in an identification table 14 in the external computer unit 4. For this purpose, the central computer unit 4 may compare the identification check value H with identification check values stored in an identification table 14. If the transmitted identification check value H matches one of the stored identification check values H in the identification table 14, this means that the authentication unit 2 is registered in the central computer unit 4.

In a step S16, the central computer unit 4 uses the check value function h to calculate a further session check value V' from the further secret value S', the initial value Nr and the further initial value Np. If the further session check value V' calculated by the central computer unit 4 matches the session check value V sent by the authentication unit 2, in a next step S17, the index value 13 may be calculated from the further session check value V' by way of the selection algorithm m. The central computer unit 4 reads the characteristic value 7 that is associated with the calculated index value 13 from the characteristic value table 11. A further vehicle check value Hr' may be calculated for the read characteristic value 7 by way of the check value function h. Following this, the central computer unit 4 checks whether the further vehicle check value Hr' calculated by the central computer unit 4 matches the vehicle check value Hr sent by the authentication unit 2.

If this is the case, the central computer unit 4 sends an enable signal 16 to the service unit 12 in order to signal that the authentication unit 2 has been authenticated successfully by the central computer unit 4 (S18). The enable signal may be for example the further secret value S'.

The service unit 12 may use the check value function h to calculate a first enable check value M from the further secret value S' and the initial value Nr (S19). The service unit 12 may calculate a second enable check value N from the first enable check value M (S20).

In a following step, the service unit 12 may transmit the first enable check value M to the central computer unit 4 (S21).

The central computer unit 4 may use the check value function h to calculate an update value U from the secret value S and the first enable check value M (S22).

The central computer unit 4 may use an update function to update the further secret value S' (S23), such that it has a different value after the update than before the update.

The second enable check value N may be transmitted to the authentication unit 2 by the service unit 12 (S24).

The authentication unit 2 may use the check value function to calculate the first enable check value M' from the initial value Nr and the secret value S (S25) and use the check value function to calculate the second enable check value N' from the first enable check value M' (S26). In a further step S27, the authentication unit 2 checks whether the second enable check value N' calculated thereby matches the received second enable check value N. If this condition is met, the check value function is used to calculate the update value U from the secret value S and the second enable check value M' (S28). Using the update function, the secret value S is replaced with an updated secret value S using the update value U (S29).

In a further step S30, there may be provision that a predetermined communication input is initiated between the service unit 12 and the authentication unit 2 or a controller of the vehicle 1. There may also be provision that a predetermined function is activated in the service unit 12. The predetermined function may for example comprise opening a barrier, dispensing a fuel or initiating a charging procedure.

Vehicles have become an integral part of our lives. Vehicles are used to transport the majority of people and goods. During the lifetime of a vehicle, which extends from its manufacture to its scrappage, the driver of the vehicle will use a multiplicity of vehicle-related services.

At present, using vehicle-related services requires actions from the driver of the vehicle. It is thus necessary for instance for the driver to enter into a corresponding contract or to operate a machine by writing or orally. Vehicle-related services are understood to mean for example providing a parking lot, refueling the vehicle or using maintenance services or breakdown assistance services.

The introduction of smartphones has drastically changed life and the use of services. Nowadays, virtually all services are offered in digitized form and are able to be managed using smartphones. This development has not yet, or has only to a limited extent, had an effect on motor vehicle-related services. A motor vehicle-related service is defined as a set of transactions between a service provider and a client. The client is for example the driver or the owner of the vehicle. Motor vehicle-related services require at least a contract that describes the parts of the contract, authentication of the driver or of the vehicle in order to ensure an identity, and authorization of the service by the driver of the vehicle, for example in the form of a handwritten or digital confirmation.

Typical examples of motor vehicle-related services are for example refueling the vehicle, charging the vehicle or using a paid parking lot for the vehicle.

Depending on the region or target group, different types of transaction may be normal. In the German-speaking market, it is common for a filling station to offer its services only at certain opening hours during the day. The opening hours are predefined by the times when an employee is present at the filling station. During the opening hours, the client consents to the business conditions (fuel price, payment conditions, minimum amount dispensed) by refueling his vehicle at the filling station. The transaction is considered to be concluded as soon as the client has paid for the purchased fuel at the cash register in the filling station.

In various countries, such as for example in Italy, Canada and the United States of America, it is common for services of a filling station to be available all day and every day of the week. To make these opening hours possible, the filling stations have equipped their fuel pumps with payment systems. These payment systems require the client to consent to paying before the filling procedure. The client normally defines a certain amount (for example 100 dollars or euros) to which the vehicle is able to be filled. In the event that less fuel is dispensed, the actual amount is rounded down. If the vehicle is operated as part of a company fleet or rental vehicle fleet, it is normal for the driver to be provided with fuel cards. These fuel cards may be used as payment means at some filling stations. In this case, it is necessary for the client to enter relevant information during the payment procedure. This is normally the current mileage status of the vehicle to be refueled.

In the prior art motor vehicle-related services and the transactions linked thereto mostly take place manually and are therefore time-consuming and linked to high costs. The operations and transactions are susceptible to errors due to the manual operating steps. Motor vehicle-related records are mostly logged on paper and therefore require a certain amount of management in order to ensure complete logging. Authorizing motor vehicle-related services by way of manual or paper-based solutions is slow, susceptible to errors, expensive and requires a high archiving expenditure.

Said problems are able to be solved by predefining motor vehicle-related services that are used by the driver and storing said driver's registration data on a central computer unit. In this case, the services may be authenticated and authorized automatically at the service units by the central computer unit.

The method comprises four main components:

The first component is the input unit 3. The input unit 3 (for example a smartphone/tablet/PC/vehicle console) may have a user interface on which the driver is able to input his access data and activate the services that he wants. The further main components are the authentication unit 2, the service unit 12, which is located with the service providers, and the central computer unit 4, which is configured so as to authenticate and authorize the authentication unit 2 to the service unit 12.

There is provision in the method that all of the authentication units 2 that are provided for the method have to run through a predetermined coupling method, wherein the driver loads his registration data into the central computer unit 4 and links the authentication unit 2 to his vehicle 1. The driver performs this coupling method by way of the input unit 3. As soon as the coupling method is complete, the authentication unit 2 that is arranged in the vehicle 1 is able to authenticate itself wirelessly to the service units 12 by way of the central computer unit 4 and use the services that are offered.

The solution provides that the vehicle 1 is authenticated by the authentication unit 2 using the characteristic values 7 that are provided from the interface 9 (for example the OBD port) of the vehicle 1. If the authentication unit 2 is used with another vehicle 1, the authentication unit 2 receives other characteristic values 7 from the interface 9. The authentication will therefore not be authorized.

It is made possible to quickly, securely and automatically authenticate the driver and then to authorize the services to the service units 12.

The motor vehicle-related authentication and authorization of services takes place independently of the driver. This is useful for vehicles 1 that are used by different drivers, for example by several family members or different lessees.

Driver's licenses and vehicle documents are able to be authenticated quickly and automatically.

The method provides the driver with a central system by way of which he is able to register with different motor vehicle-related services.

The solution may be applied in general to all motor vehicle-related services. The method may in particular be used in connection with automated and cashless payments at filling stations, automatic vehicle identification and the associated granting of entry to parking lots. It may also be used to allow automatic transfer of a rental car.

FIG. 1 shows the coupling of an authentication unit 2. In this case, the driver loads his registration data onto the central computer unit 4 and selects the services that he wants. The input unit 3 guides the driver through the coupling method in which the authentication unit 2 is linked to the vehicle 1, taking into account the central computer unit 4. The central computer unit 4 uses the authentication unit 2 to search the vehicle 1 for data and identifies a subset of data, what are called the characteristic values 7, that stay the same during the time for which the authentication unit 2 is used in the vehicle 1. These characteristic values 7 are used as what is called a fingerprint of the vehicle 1 and also referred to as a keyset. The keyset may also be time-dependent since there are characteristic values 7 that, although they are transient, stay the same during the time for which the authentication unit 2 is used for a particular driver. This may for example be an inspection appointment. It should thus for example not be expected that a rental car needs to be serviced by the lessee during the rental time, and the inspection appointment thereby changes. The central computer unit 4 records data, including the driver details and the identifier of the authentication unit 2, that are relevant for the authentication of the vehicle 1.

FIG. 2 shows the application of the authentication unit 2. This may take place only when the authentication unit 2 has been coupled to the vehicle 1. In this method, the authentication unit 2 authenticates itself to the service unit 12. The service unit 12 uses the central computer unit 4 to verify the authenticity of the authentication unit 2 and provides the requested service for the vehicle 1.

The driver of the vehicle 1 has the option to subsequently activate additional services that he would like to use while using the authentication unit 2. It may for example be the case that the driver, while on holiday, is in a town for which he has not activated the use of parking lots or performing refueling operations. It may be the case that he stops in front of a filling station or a parking lot having a service unit 12 and the central computer unit 4 authenticates his identity. During the method, the central computer unit 4 may check whether the service identifier F and/or the service unit 12 in the register table 15 for the identification check value H are permissible. In other words, in the register table 15, a respective identification check value H may have associated with it at least one value that specifies what services or service units 12 are activated by the central computer unit 4 for the identification check value H, and thus for the authentication unit 2 with the associated identification value ID. It may in this case be established that the services with the service identifier F at the service unit 12 are not activated at this location for the authentication unit 2. The enable signal 16 is thus not sent by the central computer unit 4. In this case, a query signal B may be sent to the input unit 3 of the user.

Upon receiving the query signal B, the input unit 3 may output a warning signal, wherein the user may be asked whether he would like to use the services at the service unit 12 in spite of the lack of activation. In this case, the relevant parts of the contract for the services may be displayed on the input unit 3. In the event that the driver consents to these conditions by way of a predetermined user input, the input unit 3 may transmit an activation signal A to the central computer unit 4. The central computer unit 4 may then send the enable signal 16 to the service unit 12 and thus authorize the service unit 12 to provide the services with the service identifier F.

Overall, the example shows how the method is able to provide automatic authentication of vehicles in order to authorize vehicle-related services.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for authenticating a vehicle with a service unit by way of a central computer unit external to the vehicle comprising:
   transmitting an initial value from the service unit to an authentication unit in the vehicle;
   reading a request command from a request table stored in the authentication unit depending on the initial value,
   outputting the request command to an interface of the vehicle;
   executing the request command and generating an output value with a vehicle component in response;
   receiving the output value from the interface at the authentication unit;
   generating with the authentication unit a vehicle check value from the output value using a predetermined check value function;
   transmitting the vehicle check value and the initial value to the central computer unit;
   reading a characteristic value from a characteristic value table stored in the central computer unit depending on the initial value;
   generating with the central computer unit a further vehicle check value from the characteristic value using the predetermined check value function;
   checking the vehicle check value and the further vehicle check value with one another for a match by the central computer unit; and
   sending a predetermined enable signal with the central computer unit to the service unit when the vehicle check value and the further vehicle check value match.

2. The method as claimed in claim 1, further comprising:
   storing an identification value uniquely associated with the respective authentication unit in the authentication unit;
   generating an identification check value from the identification value with the authentication unit using the check value function;
   transmitting the identification check value together with the vehicle check value to the central computer unit;
   checking, with the central computer unit, the identification check value for a match against entries in an identification table stored in the computer unit; and
   sending the predetermined enable signal to the service unit from the central computer unit only when one of the entries in the identification table matches the identification check value.

3. The method as claimed of claim 1 further comprising:
   generating a second initial value with the authentication unit;
   storing a secret value in the authentication unit;
   storing a further secret value in the central computer unit;
   generating, with the authentication unit a session check value from the secret value, the initial value and the further initial value using a further predetermined check value function;
   transmitting the session check value together with the vehicle check value associated with the characteristic value to the central computer unit,
   generating, with the central computer unit, a further session check value from the further secret value, the initial value and the further initial value using the check value function;
   checking, with the central computer unit, the further session check value and the session check value for a match; and
   sending the predetermined enable signal with the central computer unit to the service unit only if the session check value matches the second session check value.

4. The method as claimed in claim 3, further comprising:
   sending the further secret value as the predetermined enable signal from central computer unit to the service unit;
   calculating a first enable check value from the further secret value and the initial value using the check value function with the service unit;
   calculating a second enable check value from the first enable check value using the check value function;
   transmitting the first enable check value to the external central computer;
   transmitting the second enable check value to the authentication unit;
   calculating an update value from the further secret value and the first enable check value, using the check value function with the central computer unit;
   updating, with the central computer unit, the further secret value with the update value using a predetermined update function;
   calculating, with the authentication unit, a further first enable check value from the secret value and the first initial value using the check value function;
   calculating, with the authentication unit, a further second enable check value from the further first enable check value using the check value function;
   comparing, with the authentication unit, the further second enable check value and the second enable check value;
   calculating, with the authentication unit, the update value from the secret value and the further first enable check value using the check value function, when the further second enable check value and the second enable check value match; and updating, with the authentication unit, the secret value with the further update value using the predetermined update function.

5. The method as claimed in claim 1, further comprising selecting the request command to be read from the request table and the characteristic value to be read from the characteristic value table by using a predetermined selection function depending on the session check value.

6. The method as claimed in claim 5, wherein the selection function is the Luhn algorithm.

7. The method as claimed in claim 1, wherein a communication procedure is initiated between the service unit and at least one of the authentication unit and a controller of the vehicle following reception of the enable signal by the service unit.

8. The method as claimed in claim 1, further comprising:
transmitting a service identifier to the central computer unit with the service unit;
checking, with the central computer unit, whether the service identifier for the identification value is activated in the central computer unit;
sending from the central computer unit the predetermined enable signal to the service unit only if when service identifier for the identification value is activated.

9. The method as claimed in claim 1, wherein the transmissions between the authentication unit and the central computer unit are routed via the service unit.

10. The method as claimed in claim 8, further comprising:
transmitting with the central computer unit a predetermined query signal to an input unit if the service identifier for the identification value is deactivated;
outputting from the input unit a predetermined warning signal upon receiving the query signal,
performing, in the case of a predetermined user input, at least one of sending an activation signal to the central computer unit from the input unit and activating the service identifier for the identification value with the central computer unit.

* * * * *